United States Patent Office 3,448,079
Patented June 3, 1969

3,448,079
PHENOLIC RESINS CONTAINING
CYANIC ESTER GROUPS
Ernst Grigat, Cologne-Stammheim, Hans-Dieter
Schminke, Cologne, and Rolf Pütter, Dussel-
dorf, Germany, assignors to Farbenfabriken
Bayer Aktiengesellschaft, Leverkusen, Germany,
a corporation of Germany
No Drawing. Filed May 24, 1966, Ser. No. 552,392
Claims priority, application Germany, May 26, 1965,
F 46,164
Int. Cl. C08g 5/06, 5/18, 37/14
U.S. Cl. 260—59                     2 Claims

ABSTRACT OF THE DISCLOSURE

Aromatic cyanic acid esters produced by the reaction of phenols with cyanogen halide, phenol-formaldehyde resins having hydroxyl groups thereof replaced with cyanic acid ester groups and process of producing the same.

---

The present invention relates to novel esters of cyanic acid and to a process for their production.

It is known (see Belgian patent spicification No. 643,627) that aromatic cyanic acid esters may be produced by the reaction of phenols with cyanogen halide, in which mono- or polyphenols which may be linked to a heterocyclic radical and in which the hydroxyl groups that are to undergo reaction have in their ortho position not more than one sterically hindering substituent are reacted with cyanogen halide and a tertiary amine (molar ratio of phenolic hydroxyl group to cyanogen halide to tertiary amine being 1:1:1) in an inert organic medium at temperatures below 65° C., the tertiary amine employed being added slowly in the course of the reaction in a molar excess over the halogen cyanide employed.

Examples of suitable phenols are 4,4'-dihydroxy-diphenyl-dimethylmethane and trihydroxynaphthalenes, i.e. compounds of low molecular weight origin with a maximum of three phenolic hydroxyl groups. The yield of aryl tricyanates are in the region of 65%.

A process for the production of phenolic resins containing cyanic acid ester groups has now been found which is characterised in that phenolic resins which are soluble in organic solvents are reacted in an inert organic solvent with cyanogen halide in the presence of a base, the base being present during the reaction in a quantity less than that equivalent to the cyanogen halide employed.

By phenolic resins we mean reaction products, soluble or fusible in organic solvents, of aldehydes and ketones, preferably aldehydes, with phenols in the presence of acid or basic condensing agents. Instead of condensing aldehydes with phenols in an acid or alkaline solution, unsaturated hydrocarbons, preferably vinyl ethers, may be caused to undergo an addition reaction with phenols under the influence of alkaline catalysts at an elevated temperature. The preparation of phenolic resins has been fully described in Houben-Weyl, "Methoden der Organischen Chemie" vol. 14/2, pp. 193–291.

The preferred group of the phenolic resins to be used according to the invention are the commercial novolaks which have an average molecular weight of about 600 to 1500 and which generally do not contain any functional groups other than the phenolic group.

Another group of reactants for the process according to the invention are the so-called resols. Resols essentially contain mono- and polyvalent phenols containing hydroxymethyl groups, dihydroxydiphenylmethanes and dihydroxydibenzylethers. They are soluble in water and/or alcohol depending on the degree of condensation. By virtue of their being hydroxybenzyl alcohols they are accesible to numerous conversion reactions.

Mixtures of phenolic resins of the novolak and resol type and novolaks which contain hydroxymethyl groups as a result of after-condensation of novolak with formaldehyde in alkaline solution may be used in the process of the invention.

The cyanogen halides employed are cyanogen chloride and cyanogen bromide, preferably cyanogen chloride. When cyanogen chloride is used, the reaction is preferably carried out between −30° C. and its boiling point (13° C.). When cyanogen bromide is used temperatures between −30° C. and 70° C. can advantageously be used.

The bases used may be alkali metal hydroxides or alkaline earth hydroxides, alkali metal carbonates and alkali metal bicarbonates, alcoholates or tertiary amines. The following are mentioned as examples of suitable bases: NaOH, KOH, Ca(OH)$_2$, Ba(OH)$_2$, NaHCO$_3$, Na$_2$CO$_3$, K$_2$CO$_3$, Li$_2$CO$_3$, NaOCH$_3$, trimethylamine, triethylamine, tripropylamine and diethylcyclohexylamine.

The process according to the invention is preferably carried out in the precence of inert organic solvents such as alcohols, ketones, ethers, nitriles, esters, amides, aromatic and aliphatic hydrocarbons which may be nitrated or halogenated, sulphoxides or sulphones. Water may also be used. The following solvents are mentioned by way of example: Methanol, ethanol, acetone, diethylether, acetonitrile, ethyl acetate, dimethylformamide, benzene, petroleum ether, nitrobenzene, nitromethane, chloroform, carbon tetrachloride, chlorobenzene and dimethylsulphoxide.

In general, the reaction is carried out by placing the phenolic resin and the cyanogen halide, preferably in a liquid medium, into the reaction vessel and adding the base. A different sequence may however be employed provided care is taken to ensure that the base is always present in less than the quantity equivalent to the cyanogen halide, e.g. the phenolic resin may be placed into the reaction vessel and cyanogen halide and base may then be added. The salt produced by neutralisation is removed from the reaction product. The total molar ratio of halogen cyanide:phenolic OH group to be reacted:base is 1:1:1. One is free to convert either all the OH groups present in the phenolic resin or only a part into —OCN.

It is surprising that in the case of the higher molecular weight novolaks the phenolic resins containing cyanate groups can be obtained in yields of over 90% since it was known that in the case of the much lower molecular weight aryl tricyanates the yields were about 65% of the theoretical yield. It is furthermore surprising that under the conditions of the process according to the invention, no secondary reactions of the resols occur in spite of the fact that the base is present in less than equivalent amount during the reaction.

The phenolic resins containing cyanic acid ester groups obtained according to the invention are new and can be used as intermediate products for synthetic resins, foils, adhesives etc. They may also be used as synthetic resins themselves.

EXAMPLE 1

106 g. of a novolak prepared from phenol and formaldehyde according to Example 2, page 273 of Houben-Weyl, vol. 14/2 which contains one OH group per 106 molecular weight units are dissolved in 250 ml. of acetone, cooled to 0° C. and treated with 60 ml. of cyanogen chloride. 145 ml. of triethylamine are then slowly added dropwise, and a further 15 ml. of cyanogen chloride are then added in the course of the reaction to replace evaporation loses. The triethyl ammonium hydrochloride produced during the reaction precipitates and is removed by suction filtration. By concentrating the filtrate by evaporation, the novolak containing cyanate groups is initially obtained as a glassy resin which takes on a crystalline appearance when dried in the desiccator. It can be directly dissolved in acetone. Yield: 120 g.=91% of theoretical. M.P.: No real melting point. At 175° C., the products becomes gelatinous but it resolidifies and at 360° C. it becomes black.

*Analysis.*—Calculated values for the unit of the following formula

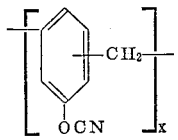

C, 73.2%; H, 3.82%; N, 10.7%; O, 12.1%. Found: C, 71.86%; H, 4.54%; N, 11.64%; O, 12.51%. Molecular weight found: About 1200. The reaction is easily followed by the IR spectrum. It has a strong —OCN band at 4.5µ.

EXAMPLE 2

An experiment carried out in a manner analogous to Example 1, in which only half the quantity of cyanogen chloride and triethylamine was reacted, led to a product which is similar in appearance but in which only half the OH groups present are converted into —OCN groups.

EXAMPLE 3

An experiment carried out in a manner analogous to Example 1 at 40 to 45° C. and in which 110 g. of cyanogen bromide were used in place of 60 ml. of cyanogen chloride gave a similar yield (90% of theoretical) of the same product.

EXAMPLE 4

In a manner analogous to Example 1, from the novolak prepared from 4-tertiary-butylphenol and acetaldehyde according to Example 10, p. 27 in Houben-Weyl, vol. 14/2, ClCN and triethylamine, a 95% yield is obtained of the corresponding novolak containing cyanic acid ester groups; the IR spectrum of this product has a pronounced band at 4.5µ.

EXAMPLE 5

60 g. of a phenolic resin prepared from resorcinol and formaldehyde according to Example 5, p. 274 of Houben-Weyl, vol. 14/2 are dissolved in 300 ml. acetone together with 60 ml. of cyanogen chloride. 140 ml. of triethylamine are added dropwise to this mixture at temperatures between 0° C. and 10° C. The resinous end product separates to a minor extent with the triethylamine hydrochloride and is freed from the latter by washing with water while the major portion of the end product is obtained as residue after concentration of the filtrate by evaporation. Yield: 91% of theoretical.

IR spectrum observation: Strong band at 4.5µ. The reaction proceeds in the same way in the presence of water with $Na_2CO_3$, NaOH, $NaHCO_3$ and $Ca(OH)_2$ as bases.

We claim:
1. An organic solvent soluble phenol-formaldehyde resin having at least one-half the hydroxyl groups thereof replaced with cyanic acid ester groups.
2. The phenol formaldehyde resin of claim 1 wherein said organic solvent phenol-formaldehyde resin in a novolak resin having an average molecular weight of from 600 to 1500.

References Cited

Chem. Abstracts, vol. 54, 1960, 2342d–g, Reese et al.

WILLIAM H. SHORT, *Primary Examiner.*

H. SCHAIN, *Assistant Examiner.*

U.S. Cl. X.R.

260—32.8, 51, 53, 54, 55